US012576394B2

(12) United States Patent
Yoshimoto et al.

(10) Patent No.: US 12,576,394 B2
(45) Date of Patent: Mar. 17, 2026

(54) OXYGEN STORAGE/RELEASE MATERIAL AND METHOD FOR PRODUCING THE SAME

(71) Applicants: Eriko Yoshimoto, Toyota (JP); Nobuyuki Takagi, Toyota (JP); Takuya Okuda, Hamamatsu (JP); Yuhei Udagawa, Hamamatsu (JP); Takahiro Harada, Fujieda (JP)

(72) Inventors: Eriko Yoshimoto, Toyota (JP); Nobuyuki Takagi, Toyota (JP); Takuya Okuda, Hamamatsu (JP); Yuhei Udagawa, Hamamatsu (JP); Takahiro Harada, Fujieda (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 460 days.

(21) Appl. No.: 18/134,098

(22) Filed: Apr. 13, 2023

(65) Prior Publication Data
US 2023/0356192 A1    Nov. 9, 2023

(30) Foreign Application Priority Data
May 6, 2022    (JP) ................................. 2022-076765

(51) Int. Cl.
B01J 23/10          (2006.01)
B01J 23/00          (2006.01)
(Continued)

(52) U.S. Cl.
CPC ............. *B01J 23/10* (2013.01); *B01J 23/002* (2013.01); *B01J 35/40* (2024.01); *B01J 35/735* (2024.01);
(Continued)

(58) Field of Classification Search
CPC . B01J 23/10; B01J 35/735; B01J 35/40; B01J 2235/15; B01J 23/002; B01J 37/0009; B01J 37/16; C01G 25/006
See application file for complete search history.

(56) References Cited

U.S. PATENT DOCUMENTS

2016/0121302 A1    5/2016    Morikawa et al.
2016/0184801 A1    6/2016    Morikawa et al.
2018/0065111 A1    3/2018    Saito et al.

FOREIGN PATENT DOCUMENTS

CN          105339308 A    2/2016
JP          2015-818 A    1/2015
(Continued)

*Primary Examiner* — James A Fiorito
(74) *Attorney, Agent, or Firm* — OLIFF PLC

(57) ABSTRACT

The present disclosure provides an oxygen storage/release material that has achieved both the improved oxygen storage/release capacity at low temperature and heat tolerance, which comprises a ceria-zirconia-based composite oxide, wherein the ceria-zirconia-based composite oxide further comprises praseodymium (Pr) or neodymium (Nd), and has, in at least a part thereof, at least one ordered phase of κ phase and a pyrochlore phase, a proportion of primary particles having particle diameters of 0.4 μm to 1.5 μm is 40% to 100% on a particle number basis, and, when heated for 5 hours in the air at 1,100° C., I(14/29) value is 0.015 or more and I(28/29) value is 0.08 or less. The present disclosure also relates to a method for producing such oxygen storage/release material.

4 Claims, 3 Drawing Sheets

(51) Int. Cl.

| | | |
|---|---|---|
| B01J 35/40 | (2024.01) | |
| B01J 35/70 | (2024.01) | |
| B01J 37/00 | (2006.01) | |
| B01J 37/16 | (2006.01) | |
| C01G 25/00 | (2006.01) | |

(52) U.S. Cl.

CPC ........... B01J 37/0009 (2013.01); B01J 37/16 (2013.01); C01G 25/006 (2013.01); *B01J 2235/15* (2024.01); *B01J 2235/30* (2024.01); *C01P 2002/36* (2013.01); *C01P 2002/54* (2013.01); *C01P 2002/72* (2013.01); *C01P 2004/61* (2013.01); *C01P 2004/62* (2013.01)

(56) References Cited

FOREIGN PATENT DOCUMENTS

| JP | 2015-34113 A | 2/2015 |
|---|---|---|
| JP | 2018-38999 A | 3/2018 |
| JP | 2018-150207 A | 9/2018 |
| JP | 2019217464 A | 12/2019 |

OXYGEN STORAGE/RELEASE MATERIAL AND METHOD FOR PRODUCING THE SAME

CROSS REFERENCE TO RELATED APPLICATION

The present application claims priority from Japanese patent application JP 2022-076765 filed on May 6, 2022, the content of which is hereby incorporated by reference into this application.

BACKGROUND

Technical Field

The present disclosure relates to an oxygen storage/release material and a method for producing the same. More specifically, the present disclosure relates to an oxygen storage/release material for an exhaust gas purifying catalyst and a method for producing the same.

Background Art

An exhaust gas discharged from an internal combustion engine used in, for example, an automobile, contains harmful gas, such as carbon monoxide (CO), nitrogen oxide (NOx), and unburned hydrocarbon (HC). An exhaust gas purifying catalyst that degrades such harmful gas (a so-called "three-way catalyst") contains, in addition to a noble metal that purifies exhaust gas, an oxygen storage/release material (also referred to as an "oxygen storage material" or "OSC material") that has the oxygen storage/release capacity (also referred to as the "oxygen storage capacity (OSC)"). An oxygen storage/release material stores and releases oxygen to regulate the air-fuel ratio (A/F). Thus, an oxygen storage/release material can suppress a lowering in the purification efficiency caused by variations of exhaust gas compositions.

As an oxygen storage/release material, a ceria-zirconia-based composite oxide has been extensively used. In particular, a ceria-zirconia-based composite oxide comprising an ordered phase, which is a pyrochlore phase or a kappa phase ($\kappa$ phase), has been extensively used because of a large amount of oxygen storage/release.

JP 2015-34113 A discloses, as such ceria-zirconia-based composite oxide comprising the pyrochlore phase or the $\kappa$ phase, a ceria-zirconia-based composite oxide in which primary particles having particle diameters of 1.5 μm to 4.5 μm account for, on a particle number basis, at least 50% of all primary particles in the composite oxide. According to JP 2015-34113 A, the proportion of primary particles that have relatively large particle diameters is increased, and the proportion of fine particles that have particle diameters of less than 1.5 μm is decreased, so as to achieve heat tolerance.

JP 2018-38999 A discloses a ceria-zirconia-based composite oxide in which the secondary particle diameters (D50) are 3 μm to 7 μm. According to JP 2018-38999 A, secondary particle diameters are regulated, so as to increase the oxygen storage/release speed.

JP 2015-818 A discloses a ceria-zirconia-based composite oxide comprising, in addition to ceria and zirconia, at least one additional element selected from the group consisting of praseodymium, lanthanum, and yttrium at a particular proportion. According to JP 2015-818 A, reduction of ceria can be promoted because of inclusion of an additional element, and oxygen storage/release functions can be promoted.

While improvement of fuel efficiency and electrification of vehicles are advancing in response to increasing $CO_2$ regulation in recent years, exhaust gas temperature is decreased. Thus, an oxygen storage/release material that can exert oxygen storage/release functions at low temperature is desired. While the amount of oxygen storage/release performed by the oxygen storage/release materials having pyrochlore phase or the $\kappa$ phase as disclosed in JP 2015-34113 A, JP 2018-38999 A, and JP 2015-818 A is large, such oxygen storage/release materials are less likely to exert the oxygen storage/release functions at low temperature. It is generally known that the oxygen storage/release capacity at low temperature is improved by reducing the particle diameters of the ceria-zirconia-based composite oxide and increasing the specific surface area. However, heat tolerance is deteriorated when particle diameters are reduced.

SUMMARY

Concerning conventional oxygen storage/release materials, as described above, heat tolerance would be deteriorated when particle diameters in the ceria-zirconia-based composite oxide were reduced to improve the oxygen storage/release capacity. Thus, it was difficult to achieve both the improved oxygen storage/release capacity at low temperature and heat tolerance. Accordingly, the present disclosure provides an oxygen storage/release material that has achieved both the improved oxygen storage/release capacity at low temperature and heat tolerance.

We have conducted concentrated studies in order to provide such material. As a result, we discovered that an oxygen storage/release material that has achieved both the improved oxygen storage/release capacity at low temperature and heat tolerance could be obtained by improving the oxygen storage/release capacity at low temperature by reducing particle diameters and achieving heat tolerance by enhancing elemental uniformity to stabilize the crystalline structure. The present disclosure has been completed based on such finding.

The present disclosure is summarized as follows.

(1) An oxygen storage/release material comprising a ceria-zirconia-based composite oxide containing ceria ($CeO_2$) and zirconia ($ZrO_2$), wherein the ceria-zirconia-based composite oxide comprises, as an additional element, praseodymium (Pr) or neodymium (Nd), the ceria-zirconia-based composite oxide has, in at least a part thereof, at least one ordered phase of a $\kappa$ phase and a pyrochlore phase, primary particles having particle diameters of 0.4 μm to 1.5 μm account for, on a particle number basis, 40% to 100% of all primary particles in the ceria-zirconia-based composite oxide, and when heated for 5 hours in the air at 1,100° C. and then examined by X-ray diffractometry using CuKα, the ceria-zirconia-based composite oxide exhibits an X-ray diffraction pattern in which an intensity ratio of a diffraction line at 2θ of 14.5° to a diffraction line at 2θ of 29° {I(14/29) value} is 0.015 or more and an intensity ratio of a diffraction line at 2θ of 28.5° to a diffraction line at 2θ of 290 {I(28/29) value} is 0.08 or less.

(2) The oxygen storage/release material according to (1), which is obtained with the use of a fluorite-structured ceria-zirconia-based solid solution powder comprising, as an additional element, praseodymium (Pr) or neodymium (Nd), wherein, when heated for 5 hours in the air at 1,200° C., the solid solution powder satisfies conditions of a proportion y (%) of $Ce_{0.5}Zr_{0.5}O_2$ crystals relative to entire crystals and a content x (% by weight) of praseodymium oxide ($Pr_6O_{11}$) or neodymium oxide ($Nd_2O_3$) represented by Formula (1):

$$y \geqq -0.7079x^2 + 5.3331x + 9.4883 \tag{1}$$

wherein x is greater than 0.

(3) The oxygen storage/release material according to (1) or (2), wherein the additional element is Pr.

(4) A method for producing the oxygen storage/release material according to (1) comprising:

preparing a fluorite-structured ceria-zirconia-based solid solution powder comprising, as an additional element, praseodymium (Pr) or neodymium (Nd), wherein, when heated for 5 hours in the air at 1,200° C., the solid solution powder satisfies conditions of a proportion y (%) of $Ce_{0.5}Zr_{0.5}O_2$ crystals relative to entire crystal and a content x (% by weight) of praseodymium oxide ($Pr_6O_{11}$) or neodymium oxide ($Nd_2O_3$) represented by Formula (1):

$$y \geqq -0.7079x^2 + 5.3331x + 9.4883 \tag{1}$$

wherein x is greater than 0;

pressure-molding the ceria-zirconia-based solid solution powder; and subjecting a compact of the pressure-molded ceria-zirconia-based solid solution powder to reduction treatment including heat treatment at 1,400° C. to lower than 1,700° C.

(5) The method for producing the oxygen storage/release material according to (4), wherein the additional element is Pr.

The present disclosure can provide an oxygen storage/release material that has achieved both the improved oxygen storage/release capacity at low temperature and heat tolerance.

DETAILED DESCRIPTION

Figure 1:
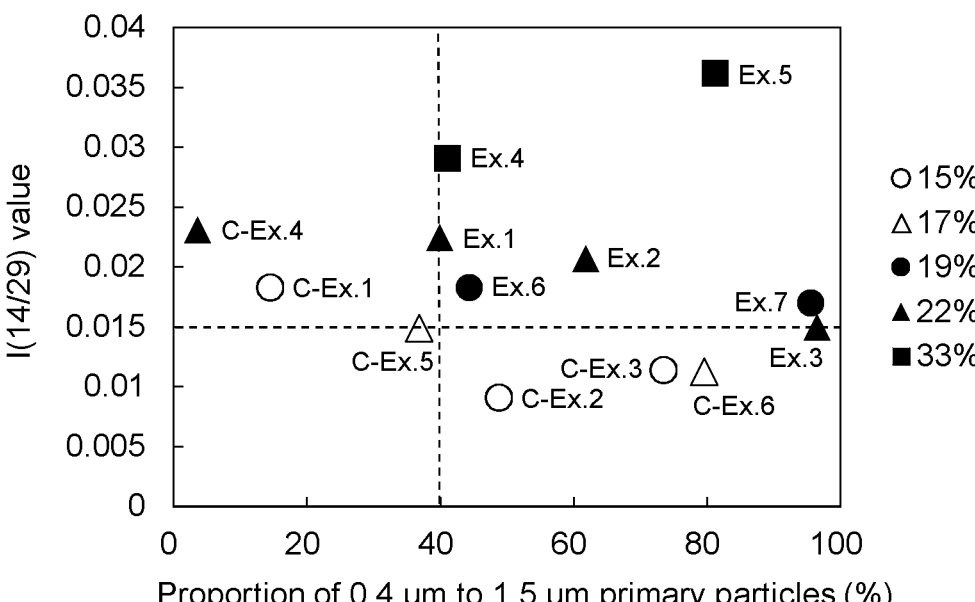
FIG. 1 shows a graph demonstrating a correlation among the proportion of primary particles having particle diameters of 0.4 μm to 1.5 μm, a degree of element dispersion after heat treatment (the proportion of $Ce_{0.5}Zr_{0.5}O_2$ crystals), and the I(14/29) value of the composite oxides of ceria-zirconia-praseodymium oxide of Examples 1 to 7 and Comparative Examples 1 to 6.

Hereafter, the present disclosure is described in detail.

The present disclosure relates to an oxygen storage/release material comprising a ceria-zirconia-based composite oxide. Specifically, the ceria-zirconia-based composite oxide of the present disclosure is used as an oxygen storage/ release material. The ceria-zirconia-based composite oxide of the present disclosure comprises ceria ($CeO_2$), zirconia ($ZrO_2$), and, as an additional element, praseodymium (Pr) or neodymium (Nd). Accordingly, the ceria-zirconia-based composite oxide of the present disclosure is a composite oxide comprising ceria, zirconia, and praseodymium oxide ($Pr_6O_{11}$) or a composite oxide comprising ceria, zirconia, and neodymium oxide ($Nd_2O_3$). It is considered that Pr or Nd contributes to stabilization of the crystalline structure of the composite oxide under the tolerance condition and that the composite oxide can achieve the high oxygen storage/release capacity and high heat tolerance with the addition of Pr or Nd. In the ceria-zirconia-based composite oxide of the present disclosure, an additional element may be Pr.

In the ceria-zirconia-based composite oxide of the present disclosure, the content ratio of (cerium+praseodymium or neodymium) to zirconium ([Ce+Pr or Nd]:[Zr]) by mole may be 1:1 to 1:1.4. In some embodiments, such content ratio may be 1:1.1 to 1:1.4 or 1:1 to 1:1.2. When such content ratio is within such range, the oxygen storage/release capacity under the tolerance condition can be sufficiently high.

In the ceria-zirconia-based composite oxide of the present disclosure, the content of an additional element, which is praseodymium (Pr) or neodymium (Nd), may be 0.5% by mole to 5% by mole relative to the total amount of all cations, so as to achieve both heat tolerance and OSC. In some embodiments, such content may be 0.5% by mole to 2.5% by mole.

In the ceria-zirconia-based composite oxide of the present disclosure, the content of ceria may be, on a weight basis, 35% by weight to 60% by weight. In some embodiments, such content may be 47% by weight to 53% by weight.

In the ceria-zirconia-based composite oxide of the present disclosure, the content of zirconia may be, on a weight basis, 40% by weight to 50% by weight. In some embodiments, such content may be 41% by weight to 47% by weight.

In the ceria-zirconia-based composite oxide of the present disclosure, the content of praseodymium oxide may be, on a weight basis, 0.1% by weight to 6% by weight. In some embodiments, such content may be 0.5% by weight to 3% by weight. In the ceria-zirconia-based composite oxide of the present disclosure, the content of neodymium oxide may be, on a weight basis, 0.1% by weight to 6% by weight. In some embodiments, such content may be 0.5% by weight to 3% by weight.

The ceria-zirconia-based composite oxide of the present disclosure may comprise at least one additional element selected from the group consisting of rare earth elements other than cerium (Ce), praseodymium (Pr), and neodymium (Nd) and alkaline earth elements. By incorporating such additional elements, a higher exhaust gas purification capacity may be achieved when the ceria-zirconia-based composite oxide of the present disclosure is used as an oxygen storage/release material for an exhaust gas purifying catalyst. Examples of rare earth elements include scandium (Sc), yttrium (Y), lanthanum (La), samarium (Sm), gadolinium (Gd), terbium (Tb), dysprosium (Dy), ytterbium (Yb), and lutetium (Lu). In some embodiments, Sc, Y, or La may be used because, when a noble metal is supported thereon, interactions with the noble metal are likely to be enhanced and affinity therebetween is likely to be enhanced. In some other embodiments, Y or La may be used. Examples of alkaline-earth metal elements include magnesium (Mg), calcium (Ca), strontium (Sr), barium (Ba), and radium (Ra). In some embodiments, Mg, Ca, or Ba may be used because, when a noble metal is supported thereon, interactions with the noble metal are likely to be enhanced and affinity therebetween is likely to be enhanced. The interaction level between such rare earth elements or alkaline-earth metal elements with low electronegativity and noble metals is high. Thus, such rare earth elements and alkaline-earth metal elements are capable of binding to noble metals via oxygen under an oxidizing atmosphere, suppressing transpiration or sintering of noble metals, and sufficiently suppressing deterioration of the noble metal as an active site at the time of exhaust gas purification.

When a ceria-zirconia-based composite oxide contains additional elements, the content of additional elements may be 1% by weight to 20% by weight in the ceria-zirconia-based composite oxide. In some embodiments, such content may be 3% by weight to 7% by weight. When the content of additional elements is within such range, the interaction level between the resulting composite oxide and noble metals supported thereon can be sufficiently enhanced, and the resulting composite oxide has the sufficient oxygen storage/release capacity.

The ceria-zirconia-based composite oxide of the present disclosure has, in at least a part thereof, at least one ordered phase of the κ phase and the pyrochlore phase. The κ phase and the pyrochlore phase are crystalline phases comprising ordered array structures formed of cerium ions and zirconium ions. Cerium ions and zirconium ions may be partially substituted with ions of an additional element such as praseodymium or neodymium. In an embodiment, cerium ions are partially substituted with praseodymium ions or neodymium ions. Formation of such ordered phases in the ceria-zirconia-based composite oxide can improve heat tolerance to high temperature. After the ceria-zirconia-based composite oxide is exposed to high temperature, accordingly, the ceria-zirconia-based composite oxide can exert the sufficiently high oxygen storage/release capacity.

The pyrochlore phase ($Ce_2Zr_2O_7$) has an oxygen defect site. When an oxygen atom enters the site, the pyrochlore phase is converted to the κ phase ($Ce_2Zr_2O_8$). In contrast, the κ phase can be converted into the pyrochlore phase by releasing an oxygen atom. As a result of phase change between the pyrochlore phase and the κ phase, oxygen storage/release takes place, and the ceria-zirconia-based composite oxide can exert the oxygen storage/release capacity. In the ceria-zirconia-based composite oxide of the present disclosure, the content ratio of the ordered phase relative to the entire crystalline phase determined based on the peak intensity ratio of the X-ray diffraction pattern described below may be 50% to 100%. In some embodiments, such content ratio may be 80% to 100%. When the content ratio of the ordered phase is within such range, the composite oxide has the high oxygen storage/release capacity and high heat tolerance.

When the ceria-zirconia-based composite oxide of the present disclosure is heated for 5 hours in the air at 1,100° C. and then examined by X-ray diffractometry using CuKα, the ceria-zirconia-based composite oxide exhibits an X-ray diffraction pattern in which an intensity ratio of a diffraction line at 2θ of 14.5° to a diffraction line at 2θ of 29° {I(14/29) value} is 0.015 or more and an intensity ratio of a diffraction line at 2θ of 28.5° to a diffraction line at 2θ of 29° {I(28/29) value} is 0.08 or less. The X-ray diffractometry can be performed, for example, with the use of an analyzer "RINT2100" (tradename, Rigaku Corporation) and CuKα beams at 40 KV, 30 mA, and 2θ of 2°/min.

The diffraction line at 2θ of 14.5° is a diffraction line from the (111) plane of the ordered phase (κ phase). Concerning the diffraction line at 2θ of 29°, the diffraction line from the (222) plane of the ordered phase overlaps with the diffraction line from the cubic crystal (111) plane of the ceria-zirconia-based solid solution. Thus, the I(14/29) value, which is the intensity ratio of the diffraction line at 2θ of 14.5° to the diffraction line at 2θ of 29°, is defined as the indicator of the maintenance rate (the abundance) of the ordered phase. When the diffraction line intensity is determined, the average diffraction line intensity at 2θ of 100 to 120 is subtracted from each diffraction line intensity as the background. The perfect ordered phase has the κ phase that is completely filled with oxygen ($Ce_2Zr_2O_8$) and the pyrochlore phase that has completely released oxygen ($Ce_2Zr_2O_7$). The I(14/29) value of the κ phase calculated based on the PDF card (PDF2:01-070-4048) is 0.04, and the I(14/29) value of the pyrochlore phase calculated based on the PDF card (PDF2:01-075-2694) is 0.05. The ordered phase can be identified on the basis that the 2θ angles of the X-ray diffraction patterns determined using CuKα have peaks at 14.5°, 28°, 37°, 44.5°, and 51°. The term "peak" used herein refers to a point at which the distance from the baseline to the peak top is 30 cps or more.

In the ceria-zirconia-based composite oxide of the present disclosure, the I(14/29) value is 0.015 or more. In some embodiments, such value may be 0.017 or more. In some other embodiments, such value may be 0.020 or more. When the I(14/29) value is 0.015 or more, the composite oxide has high heat tolerance.

The diffraction line at 2θ of 28.5° is a diffraction line from the (111) plane of $CeO_2$ by itself, the I(28/29) value, which is an intensity ratio of a diffraction line at 2θ of 28.5° to a diffraction line at 2θ of 29°, is defined as the index representing the degree of phase separation of $CeO_2$ from a composite oxide.

In the ceria-zirconia-based composite oxide of the present disclosure, the 1(28/29) value is 0.08 or less. In some embodiments, the 1(28/29) value may be 0.05 or less. In some other embodiments, the 1(28/29) value may be 0.01 or less. When the 1(28/29) value is 0.08 or less, the phase separation of ceria is sufficiently suppressed. In such a case, the oxygen storage/release capacity is sufficiently high under the high-temperature tolerance condition. While the lower limit of the 1(28/29) value is not particularly limited, a smaller value may be adopted herein.

In the ceria-zirconia-based composite oxide of the present disclosure, primary particles having particle diameters of 0.4 μm to 1.5 μm account for, on a particle number basis, 40% to 100% of all primary particles in the ceria-zirconia-based composite oxide. In some embodiments, such primary particles account for 40% to 99% of all primary particles. In some other embodiments, such primary particles account for 40% to 97.5% of all primary particles. In some embodiments, the lower limit of the proportion of the primary particles having particle diameters of 0.4 μm to 1.5 μm may be 45% or more. In some other embodiments, such lower limit may be 60% or more. In some other embodiments, such lower limit may be 80% or more. If the proportion of the primary particles having particle diameters of 0.4 μm to 1.5 μm is 40% or more, the oxygen storage/release capacity at low temperatures (e.g., 300° C. to 500° C.) can be enhanced. While conventional ceria-zirconia-based composite oxides were problematic in terms of heat tolerance lowered by reducing particle diameters in order to enhance the oxygen storage/release capacity at low temperatures, the ceria-zirconia-based composite oxide of the present disclosure can maintain heat tolerance by enhancing elemental uniformity to stabilize the crystalline structure. Thus, the ceria-zirconia-based composite oxide of the present disclosure can achieve both the enhanced oxygen storage/release capacity at low temperatures and the heat tolerance. The particle size distribution of primary particles in the ceria-zirconia-based composite oxide is the average value, which is determined by observation using a scanning electron microscope (SEM) by observing 2 or more arbitrary spots in cross sections of particles of the composite oxide, determining the crystalline particle diameters based on the number in fields of observation, and evaluating the distribution thereof. The term "crystalline particle diameter" used herein refers to a diameter of a minimum circumscribed circle when the cross section is not circular.

The ceria-zirconia-based composite oxide of the present disclosure has a sufficiently narrow range of the particle size distribution, and the composite oxide has the high oxygen storage/release capacity and high heat tolerance. In the ceria-zirconia-based composite oxide of the present disclosure, the proportion of primary particles having particle diameters of smaller than 0.4 m accounting for all the primary particles is 3% or lower on a particle number basis. In some embodiments, such primary particles may not be present. In addition, the proportion of primary particles having particle diameters of larger than 1.5 m accounting for all the primary particles is 10% or lower on a particle number basis. In some embodiments, such primary particles may not be present.

A method for producing the ceria-zirconia-based composite oxide of the present disclosure is as described below. The ceria-zirconia-based composite oxide of the present disclosure may be obtained with the use of a fluorite-structured ceria-zirconia-based solid solution powder having a particular degree of element dispersion. Such ceria-zirconia-based solid solution powder comprises, as an additional element, Pr or Nd. That is, the ceria-zirconia-based solid solution powder is a ceria-zirconia-praseodymium oxide ($Pr_6O_{11}$) or ceria-zirconia-neodymium oxide ($Nd_2O_3$) solid solution powder.

In some embodiments, the fluorite-structured ceria-zirconia-based solid solution powder (containing, as an additional element, Pr or Nd) used to produce the ceria-zirconia-based composite oxide of the present disclosure may satisfy the conditions of the proportion y (%) of $Ce_{0.5}Zr_{0.5}O_2$ crystals relative to the entire crystals when heated for 5 hours in the air at 1,200° C., and the content x (% by weight) of praseodymium oxide ($Pr_6O_{11}$) or neodymium oxide ($Nd_2O_3$) in the solid solution powder represented by Formula (1) below:

$$Y \geq -0.7079x^2 + 5.3331x + 9.4883 \tag{1}$$

wherein x is greater than 0.

As the fluorite-structured ceria-zirconia-based solution powder used to obtain the ceria-zirconia-based composite oxide of the present disclosure, the powder described below with respect to the production method of the present disclosure can be used.

The present disclosure includes a method for producing the oxygen storage/release material (the ceria-zirconia-based composite oxide) described above. The method for producing the ceria-zirconia-based composite oxide of the present disclosure comprises: preparing a fluorite-structured ceria-zirconia-based solid solution powder comprising, as an additional element, praseodymium (Pr) or neodymium (Nd) (Step 1); pressure-molding the ceria-zirconia-based solid solution powder (Step 2); and subjecting a compact of the pressure-molded ceria-zirconia-based solid solution powder to reduction treatment including heat treatment at 1,400° C. to lower than 1,700° C. (Step 3).

In Step 1, a fluorite-structured ceria-zirconia-based solid solution powder comprising, as an additional element, Pr or Nd is prepared. In the present disclosure, a solid solution powder with high elemental uniformity is used, so that elements are uniformly arranged, the crystalline structure is stabilized, and a ceria-zirconia-based composite oxide with high heat tolerance is thus obtained. The additional element of the ceria-zirconia-based composite oxide of the present disclosure is the same as that of the fluorite-structured ceria-zirconia-based solid solution powder. When the additional element of the ceria-zirconia-based composite oxide is Pr, the additional element of the fluorite-structured ceria-zirconia-based solid solution powder is also Pr. When the additional element of the ceria-zirconia-based composite oxide is Nd, the additional element of the fluorite-structured ceria-zirconia-based solid solution powder is also Nd.

In the present disclosure, the proportion of the $Ce_{0.5}Zr_{0.5}O_2$ crystals in which the ratio of Ce to Zr is 1:1 relative to the entire crystals is defined as "a degree of element dispersion," and the degree of element dispersion is used as the index of elemental uniformity. The ceria-zirconia-based solid solution powder of the present disclosure comprises, as an additional element, praseodymium (Pr) or neodymium (Nd), and some cerium ions are replaced with praseodymium ions or neodymium ions in the crystals. That is, the term "$Ce_{0.5}Zr_{0.5}O_2$ crystals in which the ratio of Ce to Zr is 1:1" refers to the $(Ce+Pr$ or $Nd)_{0.5}Zr_{0.5}O_2$ crystals in which the ratio of $(Ce+Pr$ or $Nd)$ to Zr is 1:1.

When the fluorite-structured ceria-zirconia-based solid solution powder is subjected to heat treatment at high temperatures (e.g., 1,100° C. or higher), the crystalline structure of $Ce_{0.5}Zr_{0.5}O_2$ in which the ratio of Ce to Zr is 1:1 is separated into the Ce-rich or Zr-rich crystalline structure. When there is an unstable region in which elements are not uniformly arranged in the ceria-zirconia-based solid solution powder, for example, additional elements, such as praseodymium or neodymium, are segregated, or the cerium sequence and the zirconium sequence are uneven, the proportion of phase separation is deduced to increase in the crystals. If the proportion of the $Ce_{0.5}Zr_{0.5}O_2$ crystals remaining without undergoing phase-separation relative to the entire crystals is high when the fluorite-structured ceria-zirconia-based solid solution powder is heated for 5 hours in the air at 1,200° C., elements may be more uniformly arranged, the resulting ceria-zirconia-based composite oxide may be less likely to be modified into the fluorite-structured crystal structure, and deterioration may be suppressed.

A degree of element dispersion after heat treatment at 1200° C. can be determined by X-ray diffraction pattern analysis using $CuK\alpha$ obtained by X-ray diffraction analysis after the heat treatment of the fluorite-structured ceria-zirconia-based solid solution powder under the conditions described above. In X-ray diffraction pattern analysis, the areas of the peaks detected at $2\theta$ of 29° ($Ce_{0.6}Zr_{0.4}O_2$ crystals), $2\theta$ of 29.3° ($Ce_{0.5}Zr_{0.5}O_2$ crystals), and $2\theta$ of 29.8° ($Ce_{0.2}Zr_{0.8}O_2$ crystals) are determined, and the proportion of the peak areas at 29.3° relative to the entire peak areas are calculated. Thus, such degree of element dispersion can be determined.

When the fluorite-structured ceria-zirconia-based solid solution powder (containing, as an additional element, Pr or Nd) used to produce the ceria-zirconia-based composite oxide of the present disclosure is heated for 5 hours in the air at 1,200° C., the proportion y (%) of $Ce_{0.5}Zr_{0.5}O_2$ crystals relative to the entire crystals and the content x (% by weight)

of praseodymium oxide ($Pr_6O_{11}$) or neodymium oxide ($Nd_2O_3$) in the solid solution powder satisfy Formula (1) below:

$$Y \geq -0.7079x^2 + 5.3331x + 9.4883 \qquad (1)$$

wherein x is greater than 0 (x>0).

In the ceria-zirconia-based solid solution powder that satisfies Formula (1) above, a degree of element dispersion remains high and elements are more uniformly arranged after the heat treatment at 1,200° C. With the use of such solid solution powder, accordingly, a ceria-zirconia-based composite oxide with a stabilized crystalline structure and high heat tolerance can be obtained.

In Formula (1) above, x is greater than 0 (x>0). In order to achieve a high oxygen storage/release capacity, accordingly, x may be equal to or greater than 0.6 (x≥0.6). In order to achieve both the heat tolerance and the OSC performance, x may be equal to or smaller than 6 (x≤6). In some embodiments, x may be equal to or smaller than 3 (x≤3). In some other embodiments, x may be greater than 0 and equal to or smaller than 6 (0<x≤6). In some other embodiments, x may be equal to or greater than 0.6 and equal to or smaller than 3 (0.6≤x≤3).

In some embodiments, the degree of element dispersion after heat treatment (y in Formula (1)) may be 19% or higher. In some other embodiments, such degree may be 22% or higher. In some other embodiments, such degree may be 25% or higher. When the degree of element dispersion after heat treatment is 19% or higher, the resulting ceria-zirconia-based composite oxide has high heat tolerance.

When an additional element is Pr in an embodiment, a degree of element dispersion after heat treatment may be 19% or higher. In some embodiments, such degree may be 22% or higher. In some other embodiments, such degree may be 25% or higher. When the content x (% by weight) of praseodymium oxide ($Pr_6O_{11}$) is greater than 0 and equal to or smaller than 1 (0<x≤1) in an embodiment, a degree of element dispersion after heat treatment may be 14% or higher. In some other embodiments, such degree may be 15% or higher. When the content x (% by weight) of praseodymium oxide ($Pr_6O_{11}$) is equal to or greater than 1 and equal to or smaller than 2 (1≤x≤2) in another embodiment, a degree of element dispersion after heat treatment may be 17% or higher. In some other embodiments, such degree may be 18% or higher. When the content x (% by weight) of praseodymium oxide ($Pr_6O_{11}$) is equal to or greater than 2 and equal to or smaller than 3 (2≤x≤3) in another embodiment, a degree of element dispersion after heat treatment may be 19% or higher. In some other embodiments, such degree may be 20% or higher. In these embodiments, x and y satisfy Formula (1).

When an additional element is Nd in an embodiment, a degree of element dispersion after heat treatment may be 21% or higher. In some embodiments, such degree may be 24% or higher. In some other embodiment, such degree may be 27% or higher. When the content x (% by weight) of neodymium oxide ($Nd_2O_3$) is greater than 0 and equal to or smaller than 1 (0<x≤1) in an embodiment, a degree of element dispersion after heat treatment may be 16% or higher. In some other embodiments, such degree may be 17% or higher. When the content x (% by weight) of neodymium oxide ($Nd_2O_3$) is equal to or greater than 1 and equal to or smaller than 2 (1≤x≤2) in another embodiment, a degree of element dispersion after heat treatment may be 19% or higher. In some other embodiments, such degree may be 20% or higher. When the content x (% by weight) of neodymium oxide ($Nd_2O_3$) is equal to or greater than 2 and equal to or smaller than 3 (2≤x≤3) in another embodiment, a degree of element dispersion after heat treatment may be 21% or higher. In some other embodiments, such degree may be 22% or higher. In these embodiments, x and y satisfy Formula (1).

The ceria-zirconia-based solid solution powder can be prepared by, for example, a so-called coprecipitation method. According to the coprecipitation method, for example, an aqueous solution containing a salt (e.g., nitrate salt) of cerium, a salt (e.g., nitrate salt) of zirconium, and a salt (e.g., nitrate salt) of praseodymium or a salt (e.g., nitrate salt) of neodymium is used to prepare a mixed solution of starting compounds, the mixed solution of starting compounds is mixed with an aqueous solution of alkaline compounds, and the resulting mixture is stirred to form a coprecipitate. Further, the obtained coprecipitate is filtered, washed, dried, sintered, and then ground using a grinder such as a ball mill, according to need, to obtain a ceria-zirconia-based solid solution powder. According to need, a salt of at least one additional element selected from the group consisting of rare earth elements and alkaline earth elements, a surfactant (e.g., a nonionic surfactant), and the like may be added to the mixed solution of starting compounds.

According to the production method of the present disclosure, the conditions for stirring the mixture of the mixed solution of starting compounds and the aqueous solution of alkaline compounds (hereafter, the mixture may also be referred to as a "reaction solution") may be regulated in the coprecipitation method, and the amount of alkaline compounds to be used may be adjusted. Thus, a degree of element dispersion can be adjusted within a target range.

Examples of alkaline compounds include, but are not particularly limited to, aqueous ammonia, ammonium carbonate, sodium hydroxide, potassium hydroxide, and sodium carbonate. In some embodiments, aqueous ammonia and ammonium carbonate may be employed since such compounds are removed by vaporization when a precipitate is sintered or a composite oxide is sintered. In some other embodiments, aqueous ammonia may be employed.

In general, the amount of alkaline compounds used in the coprecipitation method is more than 1 equivalent relative to the total amount (mole) of cerium salt, zirconium salt, and praseodymium or neodymium salt. In some embodiments, such amount may be 1.5 equivalents or more. With the use of an excess amount of ammonia, element dispersion is enhanced, and a solid solution powder having a high degree of element dispersion can be obtained.

In the coprecipitation method, the mixed solution of starting compounds can be mixed with the aqueous solution of alkaline compounds in the manner described below. For example, the mixed solution of starting compounds may be added to or added dropwise to the aqueous solution of alkaline compounds. Alternatively, the aqueous solution of alkaline compounds may be added to or added dropwise to the mixed solution of starting compounds.

The mixture (the reaction solution) of the mixed solution of starting compounds and the aqueous solution of alkaline compounds may be stirred, so as to obtain a ceria-zirconia-based solid solution powder having a degree of element dispersion that satisfies Formula (1) after heat treatment. The stirring conditions can be identified based on the Reynolds number Re in stirring. In some embodiments, the Reynolds number Re in stirring may be 5,000 or more. In some other embodiments, the Reynolds number Re in stirring may be 10,000 or more. When the Reynolds number Re in stirring is 25,000 or more, a solid solution powder with a high degree of element dispersion in which elements are more uniformly arranged can be obtained. The upper limit of the Reynolds number Re in stirring may vary depending on, for example, a type or a scale of a stirring apparatus. At a common laboratory-scale, for example, the Reynolds number Re may be approximately 25,000. The Reynolds number Re may exceed 25,000, provided that the effects of the present disclosure are not adversely affected.

The Reynolds number Re in stirring is calculated in accordance with the following equation:

$$Re=(\rho \times n \times d^2)/\mu$$

wherein $\rho$ represents a density of the reaction solution at 25° C. (kg/m$^3$), n represents a number of rotation in stirring (rps), d represents a stirring blade span (blade diameter (m)), and $\mu$ represents the viscosity of the reaction solution at 25° C. (Pa·s).

The reaction solution can be stirred using a known or commercially available stirring apparatus. For example, a kneader, a kneading machine, a vessel-rotation stirrer, a stirring reaction tank, a V-shaped stirrer, a dual conical stirrer, a screw mixer, a sigma mixer, a flash mixer, an air stirrer, a ball mill, an edge runner, or a forced thin-film microreactor can be used. From the viewpoint of a stirring force, a forced thin-film microreactor may be used. The reaction solution may be subjected to stirring in a micro-structured reaction field.

A form of a stirring blade is not particularly limited. For example, a stirring blade in the form of a propeller, turbine, fan turbine, paddle, inclined paddle, or gate can be used. Alternatively, blades in such forms may be used in adequate combination at multiple stages.

Stirring may be performed at a speed at which stirring blades are not exposed by the vortex caused by stirring. In order to suppress the vortex caused by stirring, in addition, a cylindrical tank, a cubic tank, or a tank equipped with baffles may be used.

According to the production method of the present disclosure, for example, the rotation number in stirring and the stirring blade spans that are optimal in terms of physical properties of the reaction solution may be determined, so as to adjust the Reynolds number Re in stirring. For example, the rotation number in stirring may be adequately adjusted within a range of 80 rps to 900 rps, the stirring blade spans may be adequately adjusted within a range of 0.01 m to 0.5 m, the density of the reaction solution may be adequately adjusted within a range of 1 kg/m$^3$ to 2 kg/m$^3$, and the viscosity of the reaction solution may be adequately adjusted within a range of 0.001 Pa·s to 0.01 Pa·s, in accordance with a type of an apparatus to be used or other conditions.

The coprecipitate may be dried so as to sufficiently remove the solvent. In general, drying may be performed at 100° C. to 120° C. for 5 to 24 hours. The coprecipitate may be generally sintered at 400° C. to 600° C. for 2 to 10 hours.

In Step 2, the ceria-zirconia-based solid solution powder prepared in Step 1 is subjected to pressure-molding to obtain a compact of solid solution powder. In general, pressure-molding is performed at a pressure of 1,500 kgf/cm$^2$ to 4,000 kgf/cm$^2$. In some embodiments, pressure-molding may be performed at a pressure of 2,500 kgf/cm$^2$ to 3,500 kgf/cm$^2$. When pressure-molding is performed at a pressure within the range indicated above, the resulting ceria-zirconia-based composite oxide can achieve the high oxygen storage/release capacity and heat tolerance. A method of pressure-molding is not particularly limited. For example, a conventional method of pressure-molding, such as isostatic pressing, may be adequately employed.

In Step 3, the compact of the pressure-molded ceria-zirconia-based solid solution powder obtained in Step 2 is subjected to reduction treatment including heat treatment at 1,400° C. to lower than 1,700° C. As a result of the reduction treatment, the fluorite-structured ceria zirconia-based solid solution is converted to a ceria-zirconia-based composite oxide with the ordered phase(s); i.e., the x phase and/or the pyrochlore phase. Heat treatment may be performed at 1,400° C. to 1,650° C. In some embodiments, heat treatment may be performed at 1,500° C. to 1,600° C. When heat treatment is performed at temperatures within such range, the ordered phase can be sufficiently generated, high heat tolerance can be achieved, and the proportion of primary particles having particle diameters of 0.4 μm to 1.5 μm can be regulated within the target range. Temperature for heat treatment is adequately determined, so as to adjust the proportion of primary particles having particle diameters of 0.4 μm to 1.5 μm, the I(14/29) value, and the I(28/29) value of the resulting ceria-zirconia-based composite oxide within the given ranges according to the present disclosure.

In general, a duration of heat treatment is 0.5 to 24 hours. In some embodiments, such duration may be 1 to 10 hours. When a duration of heat treatment is within such range, phase separation into a disordered phase can be regulated, and the ordered phase can be sufficiently generated.

Reduction treatment may be performed by a method in which a compact of solid solution powder can be heated in a reducing atmosphere at a given temperature. Examples of methods that can be employed include, but are not particularly limited to: (i) a method in which the compact of solid solution powder is placed in a vacuum furnace, the inside of the furnace is made vacuum, a reducing gas is introduced into the furnace to convert the atmosphere in the furnace to a reducing atmosphere, and the reduction treatment is performed by heating under a predetermined temperature condition; (ii) a method in which a graphite furnace is used, the compact of solid solution powder is placed in the furnace, the inside of the furnace is made vacuum, heating is performed under a predetermined temperature condition to convert the atmosphere inside the furnace to a reducing atmosphere by reducing gases such as CO and HC generated from the furnace body or heating fuel; and (iii) a method in which the compact of solid solution powder is placed in a crucible filled with activated carbon, heating is performed under a predetermined temperature condition to convert the atmosphere inside the crucible to reducing atmosphere by reducing gases such as CO and HC generated from the activated carbon.

The production method of the present disclosure may further comprise, following Step 3, subjecting the ceria-zirconia-based composite oxide to oxidation treatment. As a result of the oxidation treatment, the resulting ceria-zirconia-based composite oxide can be filled with oxygen that has been lost during the reduction, and stability as oxide powders can be enhanced.

Oxidation treatment can be performed without particular limitation. For example, a ceria-zirconia-based composite oxide may be heated in the oxidizing atmosphere (e.g., in the air). While the conditions of heating temperature at the time of oxidation treatment are not particularly limited, oxidation treatment may be performed at approximately 300° C. to 800° C. A heating duration at the time of oxidation treatment is not particularly limited. In some embodiments, a heating duration may be approximately 0.5 to 10 hours.

The method of production of the present disclosure may further comprise, following the reduction treatment of Step 3 or oxidation treatment, subjecting the ceria-zirconia-based composite oxide to grinding treatment. Grinding treatment facilitates, when the resulting ceria-zirconia-based composite oxide is used for an exhaust gas purifying catalyst, handling thereof at the time of coating of a cordierite honeycomb substrate. Grinding treatment may be performed by, for example, wet grinding, dry grinding, or freeze drying without particular limitation.

The ceria-zirconia-based composite oxide of the present disclosure has the high oxygen storage/release capacity at low temperatures (e.g., 300° C. to 500° C.) and high heat tolerance. Thus, such ceria-zirconia-based composite oxide may be used as an oxygen storage/release material for an exhaust gas purifying catalyst.

EXAMPLES

Hereafter, the present disclosure is described in greater detail with reference to the examples, although the technical scope of the present disclosure is not limited to these examples.
<Preparation of Oxygen Storage/Release Material>

Composite oxides of ceria-zirconia-praseodymium oxide comprising 51.3% by weight of $CeO_2$, 45.6% by weight of $ZrO_2$, and 2.9% by weight of $Pr_6O_{11}$ were prepared in the manner described below.

Example 1

An aqueous solution of diammonium cerium nitrate, an aqueous solution of praseodymium nitrate, and an aqueous solution of zirconyl oxynitrate were mixed, the resulting mixture was added dropwise to an excess amount (1.5 equivalents) of aqueous ammonia, and the resultant was stirred at a high speed (stirred at 10,000 rpm using a stirred reactor) to obtain a coprecipitate having a uniform elemental distribution. The resulting coprecipitate was filtered and washed (with ion exchange water). Subsequently, the coprecipitate was dried at 110° C. for 10 hours or longer and sintered at 400° C. for 5 hours in the air to obtain a cerium, zirconium, and praseodymium solid solution (a fluorite-structured ceria-zirconia-praseodymium oxide ($CeO_2$—$ZrO_2$—$Pr_6O_{11}$) solid solution, hereafter, it may be referred to as a "CZP solid solution") powder.

Subsequently, the resulting ceria-zirconia-praseodymium oxide solid solution powder was packed into a polyethylene bag, the bag was degassed, and the opening of the bag was sealed by heating. The bag was then subjected to cold isostatic pressing (CIP) at a pressure of 3,000 kgf/cm² (a molding pressure) for 2 minutes using a isostatic press. Thus, a compact of the ceria-zirconia-praseodymium oxide solid solution powder was obtained. The compact was placed in a crucible filled with activated carbon, a lid was put thereon, and the crucible was then introduced into a high-speed heating electric furnace. The crucible was heated to 1,000° C. for 1 hour, heated to 1,600° C. (reduction temperature) for 4 hours, held for 5 hours, cooled to 1,000° C. for 4 hours, and then allowed to naturally cool to room temperature. Thus, a reduction product was obtained. The reduction product was oxidized by heating in the air at 500° C. for 5 hours to obtain a composite oxide of ceria-zirconia-praseodymium oxide (hereafter, it may be referred to as a "CZP composite oxide").

Example 2

The composite oxide of ceria-zirconia-praseodymium oxide of Example 2 was prepared in the same manner as in Example 1, except that sintering in the high-speed heating electric furnace was performed at 1,550° C.

Example 3

The composite oxide of ceria-zirconia-praseodymium oxide of Example 3 was prepared in the same manner as in Example 1, except that sintering in the high-speed heating electric furnace was performed at 1,500° C.

Example 4

An aqueous solution of diammonium cerium nitrate, an aqueous solution of praseodymium nitrate, and an aqueous solution of zirconyl oxynitrate were mixed, and the resulting mixture was allowed to react with an excess amount (1.5 equivalents) of aqueous ammonia in a micro-structured reaction field while stirring at high speed (with the use of a forced thin-film microreactor (M Technique)) to obtain a coprecipitate having a uniform elemental distribution. The resulting coprecipitate was filtered and washed (with ion exchange water). Subsequently, the coprecipitate was dried at 110° C. for 10 hours or longer and sintered at 400° C. for 5 hours in the air to obtain a cerium, zirconium, and praseodymium solid solution (a fluorite-structured $CeO_2$—$ZrO_2$—$Pr_6O_{11}$ solid solution) powder.

Subsequently, the resulting ceria-zirconia-praseodymium oxide solid solution powder was packed into a polyethylene bag, the bag was degassed, and the opening of the bag was sealed by heating. The bag was then subjected to cold isostatic pressing (CIP) at a pressure of 3,000 kgf/cm² (a molding pressure) for 2 minutes using a isostatic press. Thus, a compact of ceria-zirconia-praseodymium oxide solid solution powder was obtained. The compact was placed in a crucible filled with activated carbon, a lid was put thereon, and the crucible was then introduced into a high-speed heating electric furnace. The crucible was heated to 1,000° C. for 1 hour, heated to 1,600° C. (reduction temperature) for 4 hours, held for 5 hours, cooled to 1,000° C. for 4 hours, and then allowed to naturally cool to room temperature. Thus, a reduction product was obtained. The reduction product was oxidized by heating in the air at 500° C. for 5 hours to obtain a composite oxide of ceria-zirconia-praseodymium oxide.

Example 5

The composite oxide of ceria-zirconia-praseodymium oxide of Example 5 was prepared in the same manner as in Example 4, except that sintering in the high-speed heating electric furnace was performed at 1,500° C.

Example 6

An aqueous solution of diammonium cerium nitrate, an aqueous solution of praseodymium nitrate, and an aqueous solution of zirconyl oxynitrate were mixed, the resulting mixture was added dropwise to an excess amount (1.5 equivalents) of aqueous ammonia, and the resultant was stirred at a high speed (stirred at 5,000 rpm using a stirred reactor) to obtain a coprecipitate having a uniform elemental distribution. The resulting coprecipitate was filtered and washed (with ion exchange water). Subsequently, the coprecipitate was dried at 110° C. for 10 hours or longer and sintered at 400° C. for 5 hours in the air to obtain a cerium, zirconium, and praseodymium solid solution (a fluorite-structured $CeO_2$—$ZrO_2$—$Pr_6O_{11}$ solid solution) powder.

Subsequently, the resulting ceria-zirconia-praseodymium oxide solid solution powder was packed into a polyethylene bag, the bag was degassed, and the opening of the bag was sealed by heating. The bag was then subjected to cold isostatic pressing (CIP) at a pressure of 3,000 kgf/cm$^2$ (a molding pressure) for 2 minutes using a isostatic press. Thus, a compact of ceria-zirconia-praseodymium oxide solid solution powder was obtained. The compact was placed in a crucible filled with activated carbon, a lid was put thereon, and the crucible was then introduced into a high-speed heating electric furnace. The crucible was heated to 1,000° C. for 1 hour, heated to 1,600° C. (reduction temperature) for 4 hours, held for 5 hours, cooled to 1,000° C. for 4 hours, and then allowed to naturally cool to room temperature. Thus, a reduction product was obtained. The reduction product was oxidized by heating in the air at 500° C. for 5 hours to obtain a composite oxide of ceria-zirconia-praseodymium oxide.

Example 7

The composite oxide of ceria-zirconia-praseodymium oxide of Example 7 was prepared in the same manner as in Example 6, except that sintering in the high-speed heating electric furnace was performed at 1,550° C.

Comparative Example 1

An aqueous solution of diammonium cerium nitrate, an aqueous solution of praseodymium nitrate, and an aqueous solution of zirconyl oxynitrate were mixed, the resulting mixture was added dropwise to 1 equivalent amount of aqueous ammonia, and the resultant was stirred at 500 rpm using a stirrer to obtain a coprecipitate. The resulting coprecipitate was filtered and washed (with ion exchange water). Subsequently, the coprecipitate was dried at 110° C. for 10 hours or longer and sintered at 400° C. for 5 hours in the air to obtain a cerium, zirconium, and praseodymium solid solution (a fluorite-structured $CeO_2$—$ZrO_2$—$Pr_6O_{11}$ solid solution) powder.

Subsequently, the resulting ceria-zirconia-praseodymium oxide solid solution powder was packed into a polyethylene bag, the bag was degassed, and the opening of the bag was sealed by heating. The bag was then subjected to cold isostatic pressing (CIP) at a pressure of 3,000 kgf/cm$^2$ (a molding pressure) for 2 minutes using a isostatic press. Thus, a compact of ceria-zirconia-praseodymium oxide solid solution powder was obtained. The compact was placed in a crucible filled with activated carbon, a lid was put thereon, and the crucible was then introduced into a high-speed heating electric furnace. The crucible was heated to 1,000° C. for 1 hour, heated to 1,700° C. (reduction temperature) for 4 hours, held for 5 hours, cooled to 1,000° C. for 4 hours, and then allowed to naturally cool to room temperature. Thus, a reduction product was obtained. The reduction product was oxidized by heating in the air at 500° C. for 5 hours to obtain a composite oxide of ceria-zirconia-praseodymium oxide.

Comparative Example 2

The composite oxide of ceria-zirconia-praseodymium oxide of Comparative Example 2 was prepared in the same manner as in Comparative Example 1, except that sintering in the high-speed heating electric furnace was performed at 1,600° C.

Comparative Example 3

The composite oxide of ceria-zirconia-praseodymium oxide of Comparative Example 3 was prepared in the same manner as in Comparative Example 1, except that sintering in the high-speed heating electric furnace was performed at 1,500° C.

Comparative Example 4

The composite oxide of ceria-zirconia-praseodymium oxide of Comparative Example 4 was prepared in the same manner as in Example 1, except that sintering in the high-speed heating electric furnace was performed at 1,700° C.

Comparative Example 5

An aqueous solution of diammonium cerium nitrate, an aqueous solution of praseodymium nitrate, and an aqueous solution of zirconyl oxynitrate were mixed, the resulting mixture was added dropwise to 1 equivalent amount of aqueous ammonia, and the resultant was stirred at 5000 rpm using an SA reactor to obtain a coprecipitate. The resulting coprecipitate was filtered and washed (with ion exchange water). Subsequently, the coprecipitate was dried at 110° C. for 10 hours or longer and sintered at 400° C. for 5 hours in the air to obtain a cerium, zirconium, and praseodymium solid solution (a fluorite-structured $CeO_2$—$ZrO_2$—$Pr_6O_{11}$ solid solution) powder.

Subsequently, the resulting ceria-zirconia-praseodymium oxide solid solution powder was packed into a polyethylene bag, the bag was degassed, and the opening of the bag was sealed by heating. The bag was then subjected to cold isostatic pressing (CIP) at a pressure of 3,000 kgf/cm$^2$ (a molding pressure) for 2 minutes using a isostatic press. Thus, a compact of ceria-zirconia-praseodymium oxide solid solution powder was obtained. The compact was placed in a crucible filled with activated carbon, a lid was put thereon, and the crucible was then introduced into a high-speed heating electric furnace. The crucible was heated to 1,000° C. for 1 hour, heated to 1,600° C. (reduction temperature) for 4 hours, held for 5 hours, cooled to 1,000° C. for 4 hours, and then allowed to naturally cool to room temperature. Thus, a reduction product was obtained. The reduction product was oxidized by heating in the air at 500° C. for 5 hours to obtain a composite oxide of ceria-zirconia-praseodymium oxide.

Comparative Example 6

The composite oxide of ceria-zirconia-praseodymium oxide of Comparative Example 6 was prepared in the same manner as in Comparative Example 5, except that sintering in the high-speed heating electric furnace was performed at 1,500° C.

Catalyst samples were prepared using the composite oxides of ceria-zirconia-praseodymium oxide (CZP composite oxides) of Examples 1 to 7 and Comparative Examples 1 to 6, the prepared catalyst samples were subjected to the tolerance test, and the oxygen storage/release capacity of the catalyst samples was then evaluated.
<Preparation of Catalyst Samples>

The CZP composite oxides were mixed with carriers ($Al_2O_3$) comprising a noble metal (Rh) supported thereon using a blender, the mixed powder was pressurized at 1 t to press the powder, and a pressure-molded compact was obtained. The pressure-molded compact was ground using a mortar to obtain catalyst pellets of about 1 to 2 mm².

<Tolerance Test>

The tolerance test was performed under the conditions described below.

Temperature: 1,100° C. for 5 hours Gas atmosphere: 2% CO↔5% $O_2$ (switched every 5 minutes), 10% $H_2O$, the balance of $N_2$, 101/min <Oxygen Storage/Release Capacity>

The oxygen storage/release capacity was evaluated under the conditions described below.

Temperature: 400° C.

After $O_2$ (1%) was switched to CO (2%), the amount of oxygen storage/release (the amount of oxygen storage/release relative to 1 g of catalyst pellets) is calculated based on the amount of $CO_2$ produced in 15 seconds.

The CZP composite oxides of Examples 1 to 7 and Comparative Examples 1 to 6 were evaluated in the manner described below.

<Evaluation of Crystalline Structure by X-Ray Diffraction (XRD) Analysis>

The CZP composite oxides were heat-treated for 5 hours in the air at 1,100° C. to perform the tolerance test, and the crystalline phases of the CZP composite oxides after the treatment were assayed by X-ray diffraction analysis. With the use of an X-ray diffractometer "RINT-2100" manufactured by Rigaku Electric Corp., an X-ray diffraction pattern was determined using CuKα under the conditions of 40 KV, 30 mA, and 2θ of 2°/min. Thus, an intensity ratio of a diffraction line at 2θ of 14.5° to a diffraction line at 2θ of 29° {I(14/29) value} and an intensity ratio of a diffraction line at 2θ of 28.5° to a diffraction line at 2θ of 29° {I(28/29) value} were determined.

<Particle Size Distribution Measurement>

The particle size distribution of primary particles of the CZP composite oxides was measured in the manner described below. Specifically, 2 or more arbitrary spots in cross sections the CZP composite oxides were observed using a scanning electron microscope (tradename: JSM-7000F, JEOL Ltd.), the average value of the crystalline particle diameters was determined based on the number in the fields of observation (500-fold magnification, a region of 240 μm×240 μm), and distribution thereof was evaluated.

The term "crystalline particle diameter" used herein refers to a diameter of a minimum circumscribed circle when the cross section is not circular.

Degrees of element dispersion in the fluorite-structured ceria-zirconia-praseodymium oxide solid solution (CZP solid solution) powders before the reduction treatment of Examples 1 to 7 and Comparative Examples 1 to 6 were evaluated.

<Evaluation of Degree of Element Dispersion (the Proportion of $Ce_{0.5}Zr_{0.5}O_2$ Crystals)>

The fluorite-structured CZP solid solution powder was heat-treated for 5 hours in the air at 1,200° C. and the crystalline phase after the heat treatment was measured by the X-ray diffraction analysis method. With the use of an X-ray diffractometer (tradename: Smart Lab, Rigaku Electric Corp.), an X-ray diffraction pattern was determined using CuKα under the conditions of 45 KV, 200 mA, and 2θ of 1°/min. Areas of the peaks detected at 2θ of 29° ($Ce_{0.6}Zr_{0.4}O_2$ crystals), 29.3° ($Ce_{0.5}Zr_{0.5}O_2$ crystals), and 29.8° ($Ce_{0.2}Zr_{0.8}O_2$ crystals) were determined, and the proportion of peak areas at 29.3° relative to the entire peak areas (a degree of element dispersion) was calculated using an equation shown below.

$$\text{Degree of element dispersion} = \text{peak area at } 29.3°/ \text{(peak area at } 29°+\text{peak area at } 29.3°+\text{peak area at } 29.8°)$$

Figure 2:
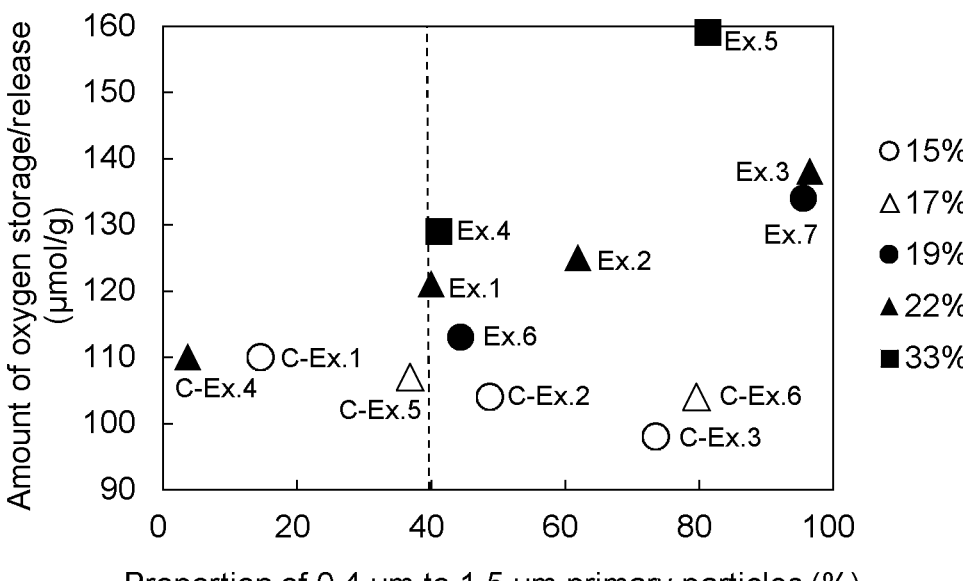
FIG. 2 shows a graph demonstrating a correlation among the proportion of primary particles having particle diameters of 0.4 μm to 1.5 μm, a degree of element dispersion after heat treatment (the proportion of $Ce_{0.5}Zr_{0.5}O_2$ crystals), and the amount of oxygen storage/release (400° C.) of the composite oxides of ceria-zirconia-praseodymium oxide of Examples 1 to 7 and Comparative Examples 1 to 6.

Table 1 shows the results of evaluation. FIG. 1 shows the correlation among the proportion of primary particles having particle diameters of 0.4 μm to 1.5 μm, a degree of element dispersion after heat treatment (the proportion of $Ce_{0.5}Zr_{0.5}O_2$ crystals), and the I(14/29) values of the composite oxides of ceria-zirconia-praseodymium oxide of Examples 1 to 7 and Comparative Examples 1 to 6. FIG. 2 shows the correlation among the proportion of primary particles having particle diameters of 0.4 μm to 1.5 μm, a degree of element dispersion after heat treatment (the proportion of $Ce_{0.5}Zr_{0.5}O_2$ crystals), and the amount of oxygen storage/release (400° C.) of the composite oxides of ceria-zirconia-praseodymium oxide of Examples 1 to 7 and Comparative Examples 1 to 6. In FIG. 1 and FIG. 2, "Ex. 1 to Ex. 7" indicates Example 1 to Example 7 and "C-Ex. 1 to C-Ex. 6" indicates Comparative Example 1 to Comparative Example 6.

TABLE 1

| | Proportion of 0.4 μm to 1.5 μm primary particles (%) (particle number basis) | Proportion of $Ce_{0.5}Zr_{0.5}O_2$ crystals (%) | I(14/29) value | I(28/29) value | Amount of oxygen storage/release (400° C.) (μmol/g) |
|---|---|---|---|---|---|
| Example 1 | 40.0 | 22 | 0.0225 | 0.008 | 121 |
| Example 2 | 61.9 | 22 | 0.0207 | 0.008 | 125 |
| Example 3 | 96.5 | 22 | 0.015 | 0.007 | 138 |
| Example 4 | 41.1 | 33 | 0.0291 | 0.006 | 129 |
| Example 5 | 81.2 | 33 | 0.0362 | 0.007 | 159 |
| Example 6 | 44.4 | 19 | 0.0183 | 0.008 | 113 |
| Example 7 | 95.5 | 19 | 0.0170 | 0.007 | 134 |
| Comparative Example 1 | 14.6 | 15 | 0.0183 | 0.011 | 110 |
| Comparative Example 2 | 48.8 | 15 | 0.0091 | 0.007 | 104 |
| Comparative Example 3 | 73.5 | 15 | 0.0114 | 0.007 | 98 |
| Comparative Example 4 | 3.6 | 22 | 0.0231 | 0.009 | 110 |
| Comparative Example 5 | 36.8 | 17 | 0.0149 | 0.008 | 107 |
| Comparative Example 6 | 79.5 | 17 | 0.0113 | 0.007 | 104 |

TABLE 1-continued

| Proportion of 0.4 µm to 1.5 µm primary particles (%) (particle number basis) | Proportion of $Ce_{0.5}Zr_{0.5}O_2$ crystals (%) | I(14/29) value | I(28/29) value | Amount of oxygen storage/release (400° C.) (µmol/g) |
| --- | --- | --- | --- | --- |

Concerning the CZP composite oxides of Examples 1 to 7, as shown in Table 1 and FIG. 1, the proportion of primary particles having particle diameters of 0.4 µm to 1.5 µm therein was 40% or higher and the I(14/29) value thereof after the tolerance test was 0.015 or more. That is, the CZP composite oxides of Examples 1 to 7 were found to have high heat tolerance. As shown in Table 1 and FIG. 1, the I(14/29) value after the tolerance test is correlated with a degree of element dispersion (the proportion of $Ce_{0.5}Zr_{0.5}O_2$ crystals) after heated for 5 hours in the air at 1,200° C. At an equivalent proportion of primary particles having particle diameters of 0.4 µm to 1.5 µm, the I(14/29) value was increased and heat tolerance was enhanced as a degree of element dispersion was increased after heat treatment. In order to obtain a CZP composite oxide with the proportion of primary particles having particle diameter of 0.4 am to 1.5 µm of 40% or higher and the I(14/29) value of 0.015 or more after the tolerance test, a fluorite-structured CZP solid solution powder with a degree of element dispersion of 19% or higher after heat treatment may be used.

As shown in Table 1 and FIG. 2, the CZP composite oxides of Examples 1 to 7 with the proportion of primary particles having particle diameter of 0.4 µm to 1.5 µm of 40% or higher and the I(14/29) value of 0.015 or more after the tolerance test were found to have the significantly high oxygen storage/release capacity at low temperature (400° C.).

<Examination of the Amount of Pr and a Degree of Element Dispersion>

The ceria-zirconia-praseodymium oxide (CZP) composite oxides of Examples 8 to 10 and the Pr-free ceria-zirconia (CZ) composite oxide of Comparative Example 7 were prepared in the same manner as in Example 7, except that the amounts of starting compounds were modified to adjust the content of the praseodymium oxide ($Pr_6O_{11}$) as shown in Table 2.

Figure 3:
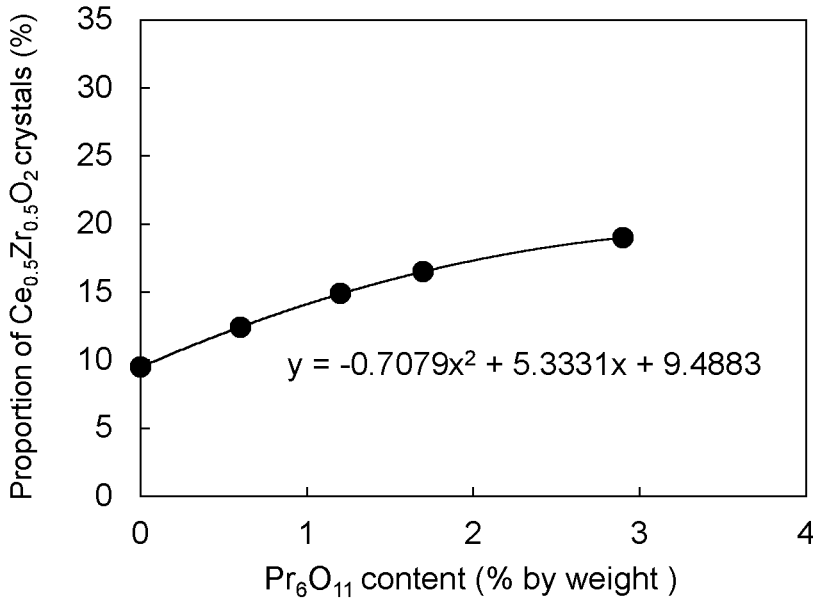
FIG. 3 shows a graph demonstrating a correlation between the content of praseodymium oxide ($Pr_6O_{11}$) in the solid solution powder and a degree of element dispersion after heat treatment (the proportion of $Ce_{0.5}Zr_{0.5}O_2$ crystals) of Examples.

The fluorite-structured CZP solid solution powders before the reduction treatment of Examples 8 to 10 and the fluorite-structured CZ solid solution powder before the reduction treatment of Comparative Example 7 were subjected to evaluation in terms of degrees of element dispersion in the manner described above. Also, the CZP composite oxides of Examples 8 to 10 and the CZ composite oxide of Comparative Example 7 were subjected to XRD analysis and measurement of particle size distribution in the manner described above. Table 2 shows the results of evaluation of Examples 8 to 10 and Comparative Example 7 and the results of evaluation of Example 7. FIG. 3 shows the correlation between the praseodymium oxide ($Pr_6O_{11}$) content in the solid solution powder and a degree of element dispersion after heat treatment (the proportion of $Ce_{0.5}Zr_{0.5}O_2$ crystals).

TABLE 2

| | $Pr_6O_{11}$ content (% by weight) | Proportion of 0.4 µm to 1.5 µm primary particles (%) (particle number basis) | Proportion of $Ce_{0.5}Zr_{0.5}O_2$ crystals (%) | I(14/29) value | I(28/29) value | Amount of oxygen storage/release (400° C.) (µmol/g) |
| --- | --- | --- | --- | --- | --- | --- |
| Example 7 | 2.9 | 95.5 | 19 | 0.0170 | 0.007 | 134 |
| Example 8 | 1.7 | 76.3 | 17 | 0.0201 | 0.008 | 131 |
| Example 9 | 1.2 | 78.2 | 15 | 0.0217 | 0.008 | 133 |
| Example 10 | 0.6 | 66.5 | 12 | 0.0228 | 0.008 | 122 |
| Comparative Example 7 | 0 | 66.8 | 10 | 0.0226 | 0.007 | 98 |

As shown in Table 2, the CZP composite oxides of Examples 7 to 10 were found to comprise primary particles having particle diameters of 0.4 µm to 1.5 µm at the proportion of 40% or higher, have the high oxygen storage/release capacity at low temperature (400° C.), and have the I(14/29) value of 0.015 or more after the tolerance test; that is, such composite oxides were found to have high heat tolerance. While the Pr-free CZ composite oxide of Comparative Example 7 was found to have both properties as described above (i.e., the proportion of the primary particles and the I(14/29) value), the oxygen storage/release capacity thereof was significantly lower than that of the CZP composite oxides.

The CZP composite oxides of Examples 7 to 10 and the CZ composite oxide of Comparative Example 7 were produced in the same manner. Accordingly, elemental uniformity in the solid solution powders obtained in the production process was deduced to be equivalent. When the amounts of Pr added were different and the $Pr_6O_{11}$ contents in the solid solution powders were different, however, degrees of element dispersion (the proportion of $Ce_{0.5}Zr_{0.5}O_2$ crystals) were different after the heat treatment at 1,200° C. even if the composite oxides were produced in the same manner, as shown in FIG. 3. That is, as the $Pr_6O_{11}$ content was decreased, the proportion of $Ce_{0.5}Zr_{0.5}O_2$ crystals was lowered. A similar tendency was observed in the CZP solid solution powders of Comparative Examples 1 to 3 in which the $Pr_6O_{11}$ content was 2.9% by weight and the proportion of $Ce_{0.5}Zr_{0.5}O_2$ crystals after the heat treatment was 15%. Pr is considered to inhibit phase separation of the fluorite-structured CZP solid solution. When the amount of Pr is decreased or Pr is not present, it is considered that phase separation is more likely to occur upon heating at 1,200° C. and the proportion of $Ce_{0.5}Zr_{0.5}O_2$ crystals is decreased even if degrees of element dispersion in the solid solution powders are equivalent before the heat treatment.

As described for Examples 1 to 7 and Comparative Examples 1 to 6 above, when $Pr_6O_{11}$ content is 2.9% by weight, in order to obtain the CZP composite oxides with the proportion of primary particles having particle diameters of 0.4 µm to 1.5 µm of 40% or higher and the I(14/29) value of 0.015 or more after the tolerance test, a fluorite-structured CZP solid solution powder with a degree of element dispersion of 19% or higher after heat treatment may be used. Further, as described above, even if the composite oxides were produced in the same manner and elemental uniformity therein was deduced to be equivalent, a degree of element dispersion after heat treatment was lowered as the $Pr_6O_{11}$ content in the solid solution powder was decreased. Concerning the fluorite-structured CZP solid solution powder used to produce the CZP composite oxide of the present disclosure, accordingly, a degree of element dispersion after heat treatment was found to be correlated with the $Pr_6O_{11}$ content. As shown in FIG. 3, the proportion y (%) of the $Ce_{0.5}Zr_{0.5}O_2$ crystals relative to the entire crystals and the $Pr_6O_{11}$ content x (% by weight) were found to satisfy Formula (1) below.

$$y \geq -0.7079x^2 + 5.3331x + 9.4883 \tag{1}$$

As shown in Table 2, Pr-free CZ composite oxide of Comparative Example 7 was found to show the amount of oxygen storage/release significantly lower than that achieved with the use of the CZP composite oxides of Examples 7 to 10. In the present disclosure, accordingly, the fluorite-structured CZP solid solution powder that satisfies Formula (1) indicated above and has the $Pr_6O_{11}$ content x of greater than 0 (i.e., Pr-containing powder) may be used. With the use of such fluorite-structured CZP solid solution powder, a CZP composite oxide with high elemental uniformity and high heat tolerance can be obtained.

The effects of the CZP composite oxide attained with the addition of Pr are considered to result from the following situations. That is, disintegration of a crystalline structure caused by diffusion of tetravalent Ce ions (0.97 Å) within the crystal is suppressed by the presence of trivalent Pr ions (1.126 Å) having the ion radius larger than those of Ce ions in the crystalline structure and the crystalline structure is maintained under the tolerance condition. The same effects can be expected with the use of trivalent Nd ions (1.109 Å) having the ion radius equivalent to those of Pr ions. When the additional element is Nd in the ceria-zirconia-based composite oxide of the present disclosure, accordingly, similar effects can be expected as with the case in which the additional element is Pr.

All publications, patents, and patent applications cited herein are incorporated herein by reference in their entirety.

What is claimed is:

1. An oxygen storage/release material comprising a ceria-zirconia-based composite oxide containing ceria ($CeO_2$) and zirconia ($ZrO_2$), wherein the ceria-zirconia-based composite oxide comprises, as an additional element, praseodymium (Pr) or neodymium (Nd), the ceria-zirconia-based composite oxide has, in at least a part thereof, at least one ordered phase of a κ phase and a pyrochlore phase, primary particles having particle diameters of 0.4 μm to 1.5 μm account for, on a particle number basis, 40% to 100% of all primary particles in the ceria-zirconia-based composite oxide, and when heated for 5 hours in the air at 1,100° C. and then examined by X-ray diffractometry using CuKα, the ceria-zirconia-based composite oxide exhibits an X-ray diffraction pattern in which an intensity ratio of a diffraction line at 2θ of 14.5° to a diffraction line at 2θ of 29° {I(14/29) value} is 0.015 or more and an intensity ratio of a diffraction line at 2θ of 28.5° to a diffraction line at 2θ of 29° {I(28/29) value} is 0.08 or less, and the oxygen storage/release material is obtained with the use of a fluorite-structured ceria-zirconia-based solid solution powder comprising, as an additional element, praseodymium (Pr) or neodymium (Nd), wherein, when heated for 5 hours in the air at 1,200° C., the solid solution powder satisfies conditions of a proportion y (%) of $Ce_{0.5}Zr_{0.5}O_2$ crystals relative to entire crystals and a content x (% by weight) of praseodymium oxide ($Pr_6O_{11}$) or neodymium oxide ($Nd_2O_3$) represented by Formula (1):

$$y \geq -0.7079x^2 + 5.3331x + 9.4883 \tag{1},$$

wherein x ≥ 0.6.

2. The oxygen storage/release material according to claim 1, wherein the additional element is Pr.

3. A method for producing the oxygen storage/release material according to claim 1 comprising:

preparing a fluorite-structured ceria-zirconia-based solid solution powder comprising, as an additional element, praseodymium (Pr) or neodymium (Nd), wherein, when heated for 5 hours in the air at 1,200° C., the solid solution powder satisfies conditions of a proportion y (%) of $Ce_{0.5}Zr_{0.5}O_2$ crystals relative to entire crystal and a content x (% by weight) of praseodymium oxide ($Pr_6O_{11}$) or neodymium oxide ($Nd_2O_3$) represented by Formula (1):

$$y \geq -0.7079x^2 + 5.3331x + 9.4883 \tag{1},$$

wherein x is ≥ 0.6;

pressure-molding the ceria-zirconia-based solid solution powder; and subjecting a compact of the pressure-molded ceria-zirconia-based solid solution powder to reduction treatment including heat treatment at 1,400° C. to lower than 1,700° C.

4. The method for producing the oxygen storage/release material according to claim 3, wherein the additional element is Pr.

* * * * *